United States Patent
Yamashita

(10) Patent No.: US 8,612,031 B2
(45) Date of Patent: Dec. 17, 2013

(54) AUDIO PLAYER AND AUDIO FAST-FORWARD PLAYBACK METHOD CAPABLE OF HIGH-SPEED FAST-FORWARD PLAYBACK AND ALLOWING RECOGNITION OF MUSIC PIECES

(75) Inventor: Kosei Yamashita, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1243 days.

(21) Appl. No.: 12/200,742

(22) Filed: Aug. 28, 2008

(65) Prior Publication Data
US 2009/0069917 A1    Mar. 12, 2009

(30) Foreign Application Priority Data

Sep. 5, 2007   (JP) .................................. 2007-230003

(51) Int. Cl.
*G06F 17/00*      (2006.01)
*H04R 29/00*      (2006.01)
*A63H 5/00*       (2006.01)

(52) U.S. Cl.
USPC .................................. 700/94; 381/56; 84/609

(58) Field of Classification Search
USPC .............. 700/94; 84/605, 609, 616, 617, 681; 381/56; 704/208, 500–504
See application file for complete search history.

(56) References Cited

U.S. PATENT DOCUMENTS

| | | | | |
|---|---|---|---|---|
| 5,734,731 A * | 3/1998 | Marx | ............................ | 381/119 |
| 6,307,141 B1 * | 10/2001 | Laroche et al. | ................. | 84/636 |
| 7,041,892 B2 * | 5/2006 | Becker | ............................ | 84/603 |
| 2004/0159221 A1 * | 8/2004 | Camiel | ........................... | 84/660 |
| 2005/0241465 A1 * | 11/2005 | Goto | ................................ | 84/616 |
| 2006/0075887 A1 * | 4/2006 | Shotwell et al. | ................ | 84/645 |
| 2007/0022867 A1 | 2/2007 | Yamashita | | |
| 2007/0261537 A1 * | 11/2007 | Eronen et al. | ................... | 84/611 |

FOREIGN PATENT DOCUMENTS

| | | |
|---|---|---|
| JP | 2002-073093 | 3/2002 |
| JP | 2007-033851 | 2/2007 |

OTHER PUBLICATIONS

Japanese Patent Office, "Notification of Reason(s) for Refusal," issued in corresponding Japanese Application No. 2007-23003, Jul. 28, 2009, 3 pages and 2-page English language translation.

* cited by examiner

*Primary Examiner* — Jesse Elbin
(74) *Attorney, Agent, or Firm* — Fitch, Even, Tabin & Flannery LLP

(57) ABSTRACT

Audio data to be played back is associated with meta data indicating the timing of beat that serves as a basis for a rhythm of a music piece. In a fast-forward playback mode, the associated meta data is read. A portion of the audio data containing the timing of beat is determined as a playback portion A and the remaining portion in a beat-to-beat interval C is determined as a non-playback portion B. Only the playback portion A is sequentially played back and output. The relative duration of a playback portion A and a non-playback portion B is determined according to a playback speed required in fast-forward playback.

13 Claims, 6 Drawing Sheets

AUDIO PLAYER AND AUDIO FAST-FORWARD PLAYBACK METHOD CAPABLE OF HIGH-SPEED FAST-FORWARD PLAYBACK AND ALLOWING RECOGNITION OF MUSIC PIECES

CROSS REFERENCE TO RELATED APPLICATION

The present application claims priority from Japanese Patent Application Serial No. JP2007-230003, filed Sep. 5, 2007, the disclosure of which is hereby incorporated by reference herein in its entirety.

BACKGROUND OF THE INVENTION

1. Field of the Invention

The present invention relates to audio playback technologies and, more particularly, to an audio player provided with the function for fast-forward playback capable of providing an acoustic output at an increased playback speed, and to an audio fast-forward playback method applied to the player.

2. Description of the Related Art

People can now make a large amount of audio data available to themselves and enjoy the audio in various ways, supported by technical aspects such as advances in audio data coding technologies, availability of large-capacity, small-sized storage devices, and improvement in network availability. Audio player for enjoying purchased music software or self-made music pieces are now highly functional; they can not only play back audio data in the order of recording but also can easily play back in a random order, skip to a next music piece, or repeatedly play back a particular music piece.

Fast-forward playback is one such function of an audio player. Generally, when a user want to listen to a part of a music piece ahead of the part being played back, the user increases the playback speed by using the function for fast-forward playback. When the playback advances to the desired part, the user returns the speed to normal. While playback may be advanced to a part ahead of the part being played back by skipping to an index recorded at the start of the data for a music piece or the data for movement, fast-forward playback is largely different from the skipping function in that the user can advance the playback while listening to an actual music piece.

Technologies for fast-forward playback include thinning out audio signals in units of samples, and thinning out audio signals in units of blocks. The former thins out digital data produced by sampling at, for example, 44.1 kHz at a rate commensurate with the required playback speed and plays back accordingly. For example, double playback speed is achieved by thinning out nth samples, where n is an odd number, and playing back even numbered samples. The latter partitions audio data into a block to be played back, a block to be dropped, and a block to be played back and so forth. For example, quadruple speed is achieved by repeating the process of playing back for one second and dropping blocks for three seconds.

One of the greatest features of fast-forward playback is that the user can listen to sound being played back as the fast-forward playback is proceeding. However, the related-art methods such as those described above have disadvantages in that, as the playback speed is increased, the user experiences significant changes in musical pitches or musical tones, or playback parts are turned into fragments of sound quite unlike the original music piece, with the result that it may be useless to let the user listen to playback. For this reason, usable playback speed is limited.

SUMMARY OF THE INVENTION

In this background, a general purpose of the present invention is to provide a fast-forward playback technology allowing users to listen to playback sound not detached from the original music piece even if the playback speed is increased.

One aspect of the present invention relates to an audio player. The audio player comprises: an input unit operative to accept an input requesting fast-forward playback of a music piece being played back; and a playback unit operative, when the input unit accepts an input requesting fast-forward playback, to play back audio data associated with the music piece by jumping in units of beats, a beat serving as a basis for a rhythm of the music piece being played back.

The phrase "jumping in units of beats" means to define the duration from a given beat and the next beat or the duration between every nth beat as a unit time, and performing playback and jump at least once, each in each unit time, where n denotes an natural number greater than 1 and a jump is defined as forward skipping.

Another aspect of the present invention also relates to an audio player. The audio player is for playing back a music piece selected by a user and providing an acoustic output accordingly and comprises: a meta data acquisition unit operative, when the user provides an input requesting fast-forward playback, to acquire beat data indicating the timing of beat that serves as a basis for a rhythm of the music piece being played back; a playback controller operative to determine a playback portion and a non-playback portion of audio data associated with the music piece in association with at least one of beats recorded in the beat data; and a playback unit operative to play back only the playback portions determined by the playback controller and preventing the non-playback portions from being played back.

Still another aspect of the present invention relates to a fast-forward audio playback method. The audio fast-forward playback method comprises: acquiring information indicating the timing of beat that serves as a basis for a rhythm of a music piece being or to be played back; determining a playback portion and a non-playback portion of the music piece in association with beats; and providing an acoustic output of only portions determined as playback portions.

Still another aspect of the present invention provides a computer readable storage medium storing a computer program adapted to allow a processor based system to achieve the function of playing back a music piece selected by a user and providing an acoustic output accordingly, the computer program comprising: a program code module for reading from a memory beat data indicating the timing of beat that serves as a basis for a rhythm of a music piece, when a user provides an input requesting fast-forward playback; a program code module for determining a playback portion and a non-playback portion of audio data associated with the music piece in association with at least one of beats recorded in the beat data; and a program code module for reading from a memory only those portions of the audio data determined as playback portions and playing back the portions thus read.

Optional combinations of the aforementioned constituting elements, and implementations of the invention in the form of methods, apparatuses, systems, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

First Embodiment

Figure 1:
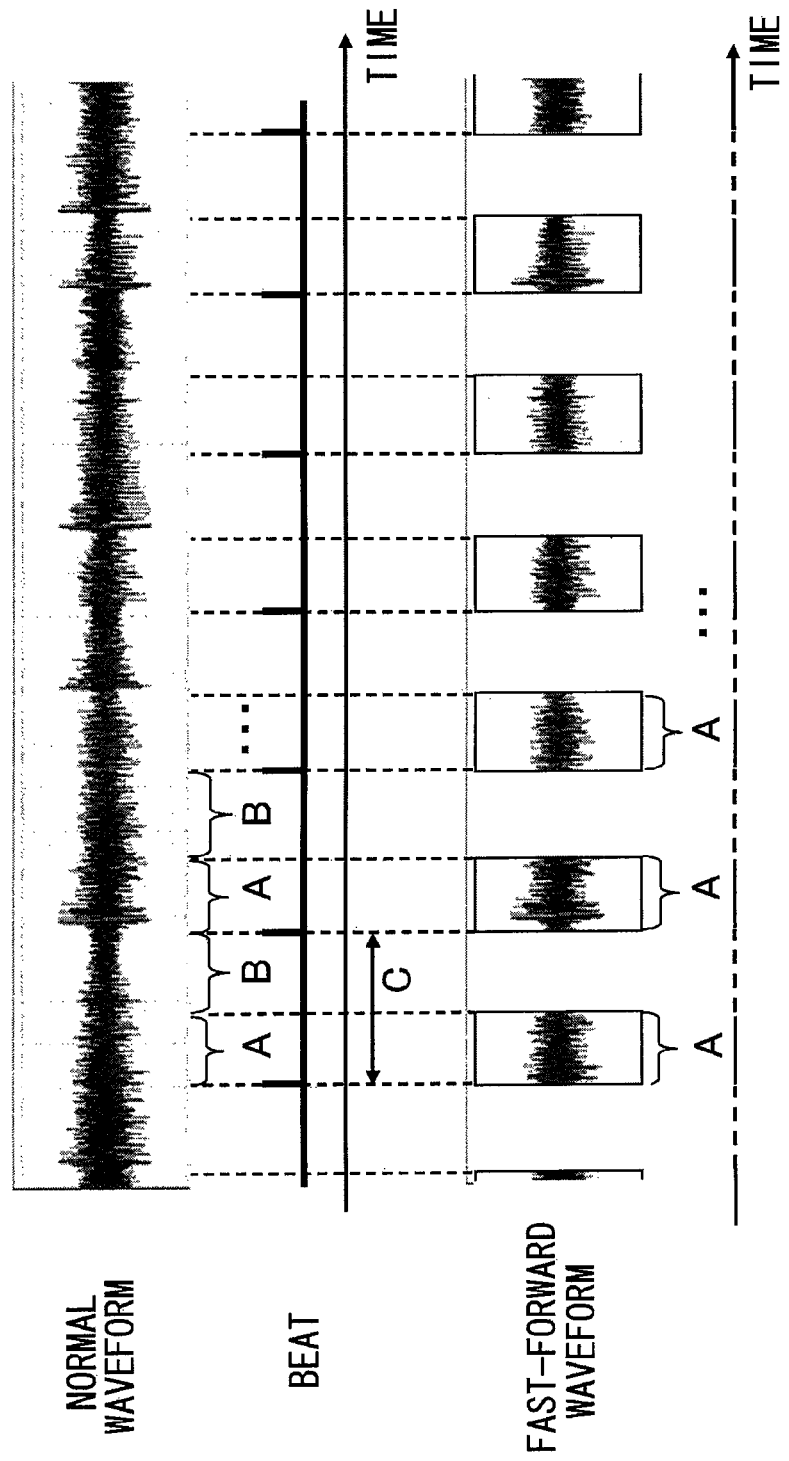
FIG. 1 is a chart illustrating the process performed in fast forwarding according to the first embodiment.

A description will be given of the principle for fast forwarding according to the embodiment. FIG. 1 is a chart illustrating the process performed in fast forwarding according to the embodiment. In fast forwarding according to this embodiment, information indicating the timing of beat that provides a basis for a rhythm of a music piece is acquired so as to determine a portion to be played back (playback portions) and a portion not to be played back (non-playback portion) with reference to the timing of beat. The timing information forms meta data stored in association with audio data. The non-playback portions are skipped and only the playback portions are output as sound.

FIG. 1 show a normal waveform, timing of beats, and a waveform occurring in fast forwarding. A normal waveform represents the waveform of an audio signal output when a music piece is played back at a normal playback speed, i.e., the time-dependent waveform of an original music piece. Hereinafter, playback for generating a signal of such a waveform will be referred to as "normal playback".

A beat serves as a time reference in a music piece. The timing of beats represents information unique to a music piece. According to the embodiment, time series data in which the timing of beats with respect to a melody line is recorded over the entirety of a music piece is prepared as meta data for each music piece. For example, data containing the timing of beats defined as elapsed time since the start of a music piece, or data containing the timing of beats defined as the number of samples occurring since the start of a music piece may be prepared. Hereinafter, the meta data such as these will be referred to as "beat data".

Beats occur substantially periodically according to the basic tempo of a music piece. Intervals between beats are often shortened or extended in association with the "flavoring" of music. It is desirable that beat data accurately traces variation in intervals between beats. An example of generating such beat data will be described in detail later. It will be noted that the embodiment may also be practiced using data indicating periodic timing simulating the timing of beats occurring in portions that conform to the basic tempo.

A fast-forward waveform is a waveform of an audio signal output in fast-forward playback. In the embodiment, a portion of an original music piece is defined as a playback portion A, the next portion is defined as a non-playback portion B, the next portion is defined as a playback portion A, etc. In fast-forward playback, only the playback portions A are played back for the user to listen to. For ease of understanding, FIG. 1 shows that the time axis of the fast-forward waveform matches that of the normal waveform. However, the non-playback portions B are skipped so that time does not elapse in the portions B. For this reason, the associated portions in the time axis of the fast-forward waveform are indicated by broken lines. Therefore, the sound heard by the user is the playback portions A concatenated.

The playback portions A and the non-playback portions B are determined by the timing of beats indicated by the beat data and the playback speed required for fast-forward playback. More specifically, the timing of starting a playback portion A is synchronized with the timing of a beat. Given that the playback speed is N times the normal speed, the duration of a playback portion A is defined as 1/N the interval C between beats. FIG. 1 shows the case of double speed so that the duration of a playback portion A is ½ the interval C between beats. As a result, the duration of a playback portion A is equal to the duration of a non-playback portion B.

As described hereinafter, a short period of time including the timing of beat in music contains more information than other periods of time. For this reason, portions that include beats are played back in preference to the other portions in fast-forward playback. The amount of information dropped in the playback sound is minimized by dropping signals in the other portions. A music piece thus played back in a fast-forward mode does not lose touch with the original piece and the user can easily recognize the music.

Figure 2:
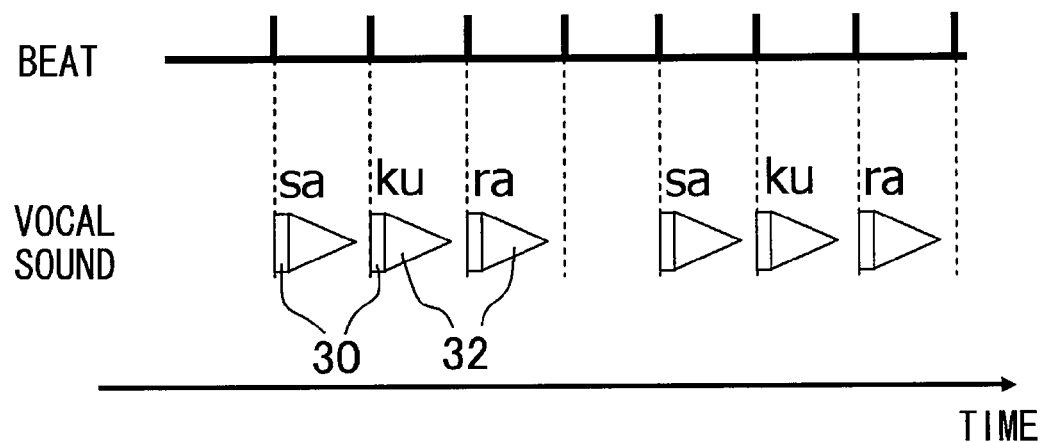
FIG. 2 schematically shows a relationship between the timing of voices and the timing of beats in a song.

FIG. 2 schematically shows a relationship between the timing of voices and the timing of beats in a song. Normally, a music piece is composed so that lyrics concur with musical notes, and the timing of beats often overlaps a musical note. Therefore, it is highly likely that a beat overlaps a vocal sound. FIG. 2 shows that three tones "sa", "ku", and "ra" are produced twice each concurrently with the beats. Referring to the graphic forms representing the sounds, a rectangle 30 indicates a period of time in which a consonant is produced and a triangle 32 indicates a period of time in which a vowel is produced. As shown in FIG. 2, for a short period of time since a vocal sound is produced, i.e., since the timing of beat, a consonant forming "sa", "ku", or "ra" is produced (rectangle 30), followed by the production of a vowel (triangle 32). The duration of vowels varies depending on music pieces.

Comparing the sound occurring immediately after a vocal sound is produced and composed of a consonant and a vowel with the subsequent, extended sound composed only of a vowel, the former definitely contains more information as sound. Thus, as will be obvious from the illustration, the short period of time including the timing of beat generally contains more information necessary to identify lyrics than the other periods of time. Compared with the voice occurring immediately after the vocal sound is produced, the subsequent, extended voice often fails to keep a pitch or is less clearly defined due, for example, to vibrato effects. In this regard, it can be said that the short period of time including the timing of beat contains information advantageous to recognize musical pitches.

In the case of sound of musical instruments in an instrumental music or instruments used for accompaniment, an attack sound that will allow one to recognize the tone inherent to the instrument or the touch unique to a player is produced, followed by a release sound lasting for a period of time defined by a musical tone. As in the case of vocal sound, the timing of beat in this case is likely to overlap the timing of attack sound. Therefore, a short period of time since the timing of beat generally contains more information (e.g., inherent tones) necessary to recognize the musical expression as embodied in a music piece and created by the musical instrument than the other periods of time. As in the case of vocal sound, the short period of time including the timing of beat contains information advantageous to recognize musical pitches.

Thus, it is important in this embodiment to capture as a playback portion the moment that a vocal sound is produced or a musical instrument is played, in order to achieve fast-forward playback while retaining as much information of an original music piece as possible. For this purpose, a playback portion A may be defined to start at a point of time preceding the timing of beat by a predetermined short period of time. This can address subtle variation or shift in tempo occurring when, for example, the timing of actual vocal sound production or pronunciation slightly precedes the timing of beat indicated by the beat data.

In the case of FIG. 1, a period of time between a given beat and the subsequent beat is defined as a unit of time. A time quotient defined by the unit is allocated to a playback portion A and to a non-playback portion B. To ensure that the above-mentioned information is captured, an absolute value of the period of time for playback portions A need be considered. For example, since a period of time of about 10 milliseconds is required to capture a combination of a consonant and a vowel produced, it is desirable that a playback portion A is longer than that. However, as the playback speed is increased, the duration of a playback portion A relative to the interval C between beats will be decreased accordingly until the duration of a playback portion A is shorter a period of time necessary to retain information.

Thus, in order to secure a certain absolute value of the duration of playback portions A even if the relative duration of playback portions A is decreased as a result of an increase in the playback speed, every nth beat (where n denotes a predetermined natural number) may be extracted from the beats recorded in the beat data and used as reference beats, when a predetermined playback speed is exceeded. For example, every second beat may be used as a reference. A playback portion A is started concurrently with the beat. Duration between that beat and the next beat is defined as a unit of time so that a time quotient defined by the unit is allocated to subsequent playback portions A and non-playback portions B. As a result, the duration of each playback portion A is twice as long as that of FIG. 1. The number of reference beats may be so preset as to be reduced in steps in accordance with the required playback speed. This can secure information included in the timing of beat even if playback is performed ten times as fast as the original. Accordingly, the limit of playback speed can be raised significantly, while allowing recognition of a music piece.

A description will now be given of a method of generating beat data invented by the present inventor in the past. A published Japanese patent document 2007-33851 describes the detailed method. The published Japanese patent document 2007-33851, which was filed in the Japanese Patent Office on Jul. 27, 2005, and published on Feb. 8, 2007, by inventor Kosei YAMASHITA, as well as corresponding U.S. Patent Application Publication No. US 2007/0022867 A1, published on Feb. 1, 2007, and based on U.S. application Ser. No. 11/486,359, filed Jul. 13, 2006, by inventor Kosei YAMASHITA, are both hereby fully incorporated by reference herein in their entireties. While the method is advantageously used especially in this embodiment in that the timing of beat can be accurately and automatically captured over the entirety of a music piece, the embodiment is not limited in its scope by the described method. As mentioned before, a pseudo beat timing may be identified from the period of beats in a part of a music piece with a constant tempo. Alternatively, manual intervention may be allowed for adjustment of timing.

Figure 3:
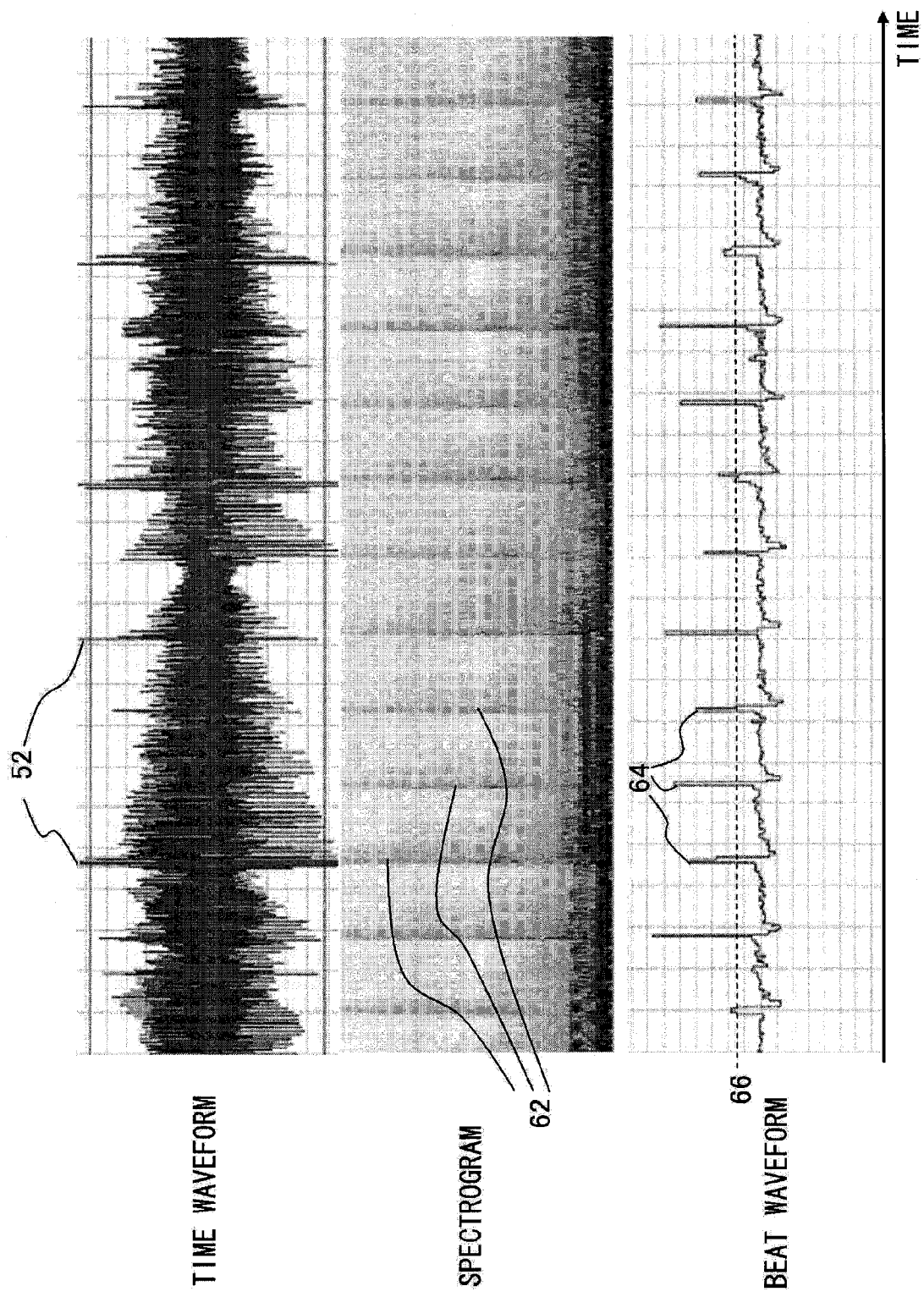
FIG. 3 shows the principle for extraction of beats that can be used to generate beat data used in the first embodiment.

FIG. 3 shows the principle for extraction of beats that can be used to generate beat data used in the embodiment. The figure shows time on the horizontal axes. In the drawing, the top chart shows a time-waveform of an audio signal, the middle chart is a spectrogram of the signal occurring in the same period of time, and the bottom chart is a waveform of beats extracted by the method. The spectrogram shows a time variation in a spectrum of an audio signal vs. frequency, in which the axis of ordinate represents frequency.

From the time waveform, timings 52 at which the peaks thereof oscillate greatly are observed. This is considered the timing at which a percussion instrument, for example, a drum or the like, beats out. However, when actually listening to the music, beats can be felt at more timings than the beat timings 52 appearing in the time waveform in many cases. This is because, for example, the time waveform is formed by various sound waveforms of which the music is composed, the sound waveforms overlapping one another. In other words, the time waveform could change in its amplitude depending on a phase of each sound wave, therefore that waveforms could often counteract one another at a beat timing, or amplify themselves at a timing other than a beat timing. Hence, the extraction of beats is hardly carried out with a sufficient accuracy.

On the other hand, from the spectrogram, it can be observed that strong instantaneous spectra 62 occur approximately periodically over a wide range of frequency band. A timing at which the spectra 62 occur agrees with a beat timing which a person feels when really listening to the music. Therefore, in the present embodiment, a timing at which the spectra 62 appear is determined to be a beat timing. Specifically, a spectrum is subjected to time derivation, and a timing at which the derivative value, that is, a time variation in the spectrum is large is determined to be a beat timing.

The specific process is as follows. A spectrum at each time is calculated by subjecting a target audio signal to ordinary processing such as an FFT (Fast Fourier Transform) operation at every predetermined period. A time derivative value of the spectrum is calculated by calculating a variation per a unit of time, with respect to the lump sum of a spectrum over the whole range of frequency band. A spectrum and a time derivative may be calculated according to an overlap process wherein a spectrum is calculated for audio signals sampled within a predetermined time period respectively, and a spectrum variation, when shifting the predetermined time period shifted by a unit of time, is acquired as a time derivative value. Thus, a spectrum with time resolution in the range of from several milliseconds to several tens of milliseconds, can be obtained.

With the above calculations, a spectrum as shown in the spectrogram is calculated from an audio signal having a waveform as represented in FIG. 3, and a beat waveform is obtained by obtaining a time derivative thereof. Subsequently, the value of a peak 64 of the beat waveform is compared with a predetermined threshold value 66. A point of time at which the threshold value 66 is exceeded is defined as the timing of beat. The time or the sample number of the timing is recorded. In some cases, beats may be added at points of time if an interval therebetween is so wider than intervals in other time segments that a beat is deemed to be missing at the points. Alternatively, beats characterized by shorter intervals than in other time segments may be deleted.

Figure 4:
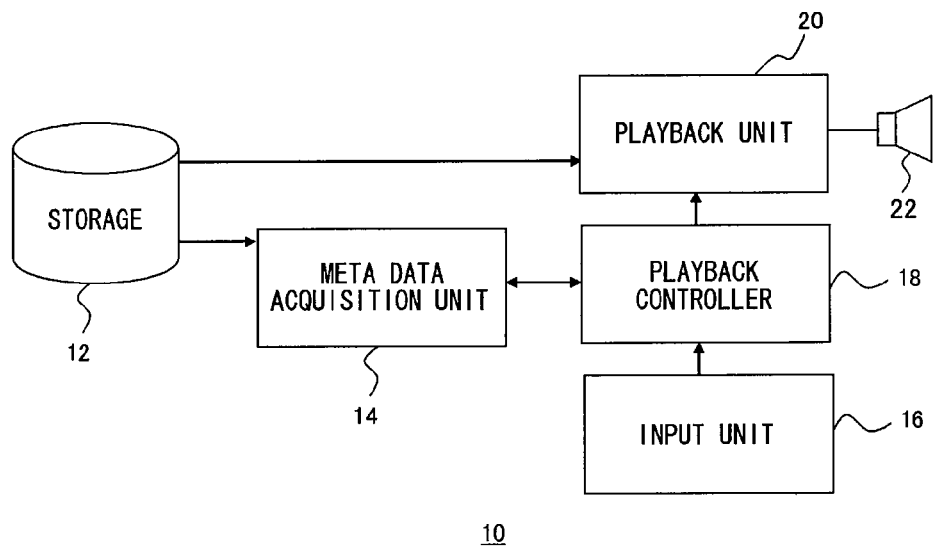
FIG. 4 shows the structure of an audio player according to the first embodiment.

A description will now be given of the structure according to the embodiment. FIG. 4 shows the structure of an audio player according to the embodiment. An audio player 10 plays back audio data corresponding to a music piece selected by the user and provides an acoustic output accordingly. The audio player 10 includes a storage 12 that stores audio data subject to selection for playback and beat data associated with each piece of audio data, an input unit 16 that provides an interface for the user to provide an instructional input, a meta data acquisition unit 14 that acquires beat data for fast-forward playback, a playback controller 18 that controls the player as a whole in accordance with an input from the user, a playback unit 20 that plays back audio data, and an output unit 22 that provides an acoustic output from a signal reproduced.

The storage 12 may be a storage device such as a flash memory or a hard disk storing audio data and built in the audio player 10. Alternatively, a combination of a recording medium such as a compact disk (CD) storing audio data with a reader may be used. The storage 12 may be a storage device in a server that provides music contents via a network (not shown). A plurality of storages 12 may be provided such that the aforementioned modes are combined. Audio data stored in the storage 12 may be produced by coding an audio signal by an ordinarily used codec such as MP3 or PCM.

Beat data associated with each item of audio data may be prepared by a music software production company or a distribution company that provide audio data and attached to the audio data. Alternatively, the user acquiring the audio data may create beat data on his or her own. Beat data may be embedded in the header of the associated audio data or may be a file independent of the audio data. In the latter case, the audio data and the beat data may not be stored in the same storage 12 so long as the association is clear by referring to an identification number or a file name. For example, the storage 12 built in the audio player 10 may store audio data, while the beat data associated with the audio data may be downloaded as necessary from the storage 12 provided in a server connected via a network.

The input unit 16 is an interface that allows the user to provide instructions for selection of audio data stored in the storage unit 12, normal playback, fast-forward playback, stop of playback, etc. to the audio player 10. The input unit 16 may be embodied by an input device provided in a commonly used audio player. In other words, the unit 16 may be a commonly used input device such as a button, a touch panel, a mouse, a track ball, or a combination of these. The input unit 16 may be integral with the audio player 10. Alternatively, the unit 16 may be separate from the audio player 10 by being embodied, for example, in a remote controller.

When the user provides an input requesting fast-forward playback via the input unit 16, the meta data acquisition unit 14 reads the beat data corresponding to the audio data being played back from the storage 12 and supplies the same to the playback controller 18.

The playback controller 18 operates the meta data acquisition unit 14 when the user provides an input requesting fast-forward playback via the input unit 16. The playback controller 18 determines the timing of switching between playback portions and non-playback portions in accordance with the beat data acquired by the meta data acquisition unit 14 and the required playback speed. The playback controller 18 controls the playback unit 20 so as to playback only the playback portions of audio data.

The required playback speed may be a fixed value defined in the audio player. Alternatively, the speed may vary depending on the input via the input unit 16. For example, the longer the fast-forward playback button provided in the input unit 16 is pressed, or the more frequent the button is pressed, the higher the speed may be continuously or in steps. The playback controller 18 converts the time or the number of times that the playback button is pressed into a playback speed associated with the time or the number in advance, so as to determine the relative duration of the playback portions A and the non-playback portions B.

When the user provides an input requesting switching from fast-forward playback to normal playback via the input unit 16, the playback controller 18 controls the playback unit 20 to play back the entirety of audio data. As in commonly used audio players, the unit 18 controls the playback unit 20 in accordance with inputs for selection of a music piece, for starting normal playback, or for stopping the playback.

The playback unit 20 reads the audio data for the music piece selected by the user from the storage 12 and plays back the music, under the control of the playback controller 18. Basically, audio data is reproduced by a commonly used scheme (e.g., decoding coded audio data and subjecting the decoded data to digital-to-analog conversion) so as to create an audio signal. In a fast-forward playback mode, only the playback portions A determined by the playback controller 18 are subject to the process. More specifically, a segment of audio data stream from the start of a playback portion A to the end thereof is decoded and subject to necessary processes such as digital-to-analog conversion. The non-playback portion B that follows is skipped and the next playback portion A is started to be processed.

The playback controller 18 refers to the real time or the number of samples representing the timing of beat in the beat data so as to compute the timing of switching between playback portions A and non-playback portions B in access units based on the audio data before decoding. With this, the destination of access by the playback unit 20 can be directly shifted from the data endpoint of a given playback portion A to the data start point of the next playback portion A.

The output unit 22 may be any commonly used acoustic output device such as speaker, headphone, or earphone so long as it is provided with the function of letting the user to listen to a reproduced audio signal acoustically.

Figure 5:
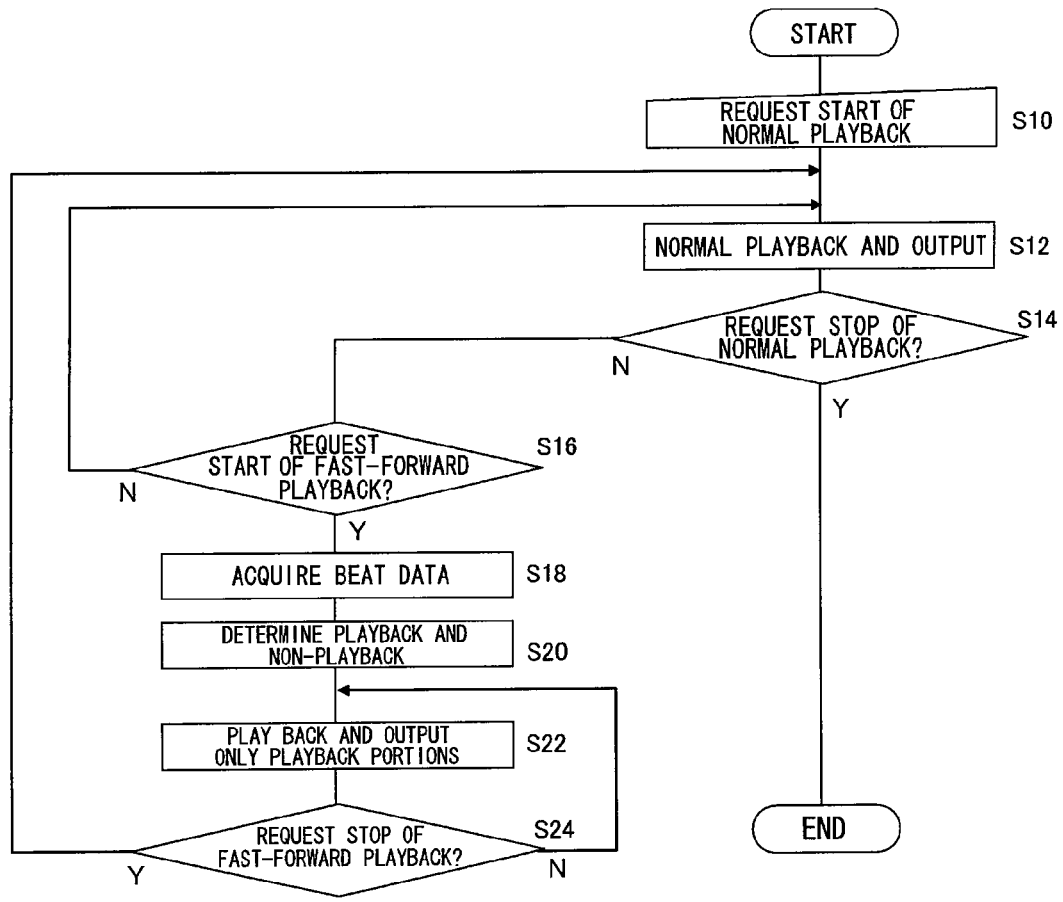
FIG. 5 is a flowchart showing the processing procedure performed by the audio player according to the first embodiment.

A description will now be given of the operation of the audio player 10 with the structure described above. FIG. 5 is a flowchart showing the processing procedure performed by the audio player 10. First, when a user selects a music piece and provides an input requesting the start of normal playback via the input unit 16 (S10), the playback unit 20 reads the audio data associated with the selected music piece from the storage 12 and plays back the data under the control of the playback controller 18, whereupon the output unit 20 provides an acoustic output accordingly (S12). Unless the user provides an input requesting the stop of normal playback or the start of fast-forward playback, the normal playback and output are continued (N in S14, N in S16, S12).

When the user provides an input requesting the start of fast-forward playback without providing an input for stopping the normal playback via the input unit 16 (N in S14, Y in S16), the playback controller 18 acquires the beat data associated with the audio data being played back via the meta data acquisition unit 14 (S18). The playback controller 18 determines the start of a playback portion A according to a predetermined rule with reference to the timing of beat. For example, the start of a playback portion A is made to concur with the timing of beat or with a point of time preceding the timing of beat by a predetermined period of time. The controller 18 determines the relative duration of playback portions A and non-playback portions B based upon the playback speed determined according to the action performed as the user provides an input requesting fast-forward playback via the input unit 16 (S20). The determination in S20 represents determination of the timing of switching between playback portions A and non-playback portions B or determination of access units in the audio data in which to effect switching.

The playback unit 20 then plays back only the playback portions A sequentially, under the control of the playback controller 18 and the output unit 22 provides an acoustic output accordingly (S22). Unless the user provides an input requesting the stop of fast-forward playback via the input unit 16, playback of playback portions and associated output are continued (N in S24, S22). When the user provides an input requesting the stop of fast-forward playback (Y in S24), the playback unit 20 returns to a normal playback mode in which the entirety of audio data is played back, under the control of the playback controller 18. The resultant sound is output by the output unit 22 (S12). When the user provides an input requesting the stop of normal playback via the input unit 16, the entire process is ended (Y in S14).

The step of acquiring beat data (S18) and the step of determining the timing of switching between playback portions A and non-playback portions B (S20) may be performed before the user provides an input requesting the start of fast-forward playback (e.g., when the audio data to be played back is determined) so that the associated data is temporarily stored in a memory (not shown). In this case, the step of S22, in which only the playback portions A are played back and output, is performed by allowing the playback controller 18 to read the timing of switching from the memory when the user provides an input requesting fast-forward playback.

Thus, according to the embodiment as described, for fast-forwarding in an audio player, playback portions and non-playback portions are determined with reference to the timing of beat in a music piece to be played back so that only the playback portions are played back. More specifically, the start of a playback portion is made to concur with the timing of beat or with a point of time preceding the timing of beat by a predetermined period of time. The relative duration of playback portions and non-playback portions is determined by the required playback speed. With this, data in the neighborhood of the timing of beat that contains important musical information such as lyrics, tones, and pitches is played back in preference to the other data. As a result, the user does not experience serious detachment from the original even when a music piece is played back in a fast-forward mode at a high speed and can recognize the music piece easily. Consequently, purposes of fast-forward playback such as search for a melody or movement to a desired location can be achieved in a short period of time.

So long as playback portions and non-playback portions can be determined as described above, the process of skipping parts of audio data according to the embodiment can be implemented by a related-art device used for fast-forward playback. In other words, the embodiment does not require special signal processes such as those using a dedicated filter. As such, the embodiment does not present obstacles for introduction and can be easily implemented in products. Moreover, since the cost required for calculation is small the embodiment can be easily implemented in devices such as portable audio devices and cell phones characterized by relatively poor computing power.

Second Embodiment

In the first embodiment, playback portions are determined with reference to the timing of beat in a music piece. In the second embodiment, the structure of a music piece is considered in addition to the timing of beat so as to achieve fast-forward playback at a higher speed in a manner that the user is capable of recognizing the contents of the music piece. The player according to the second embodiment is configured in the same way as the audio player 10 shown in FIG. 4. The following description concerns differences from the first embodiment and the description already given in the first embodiment is omitted.

Figure 6:
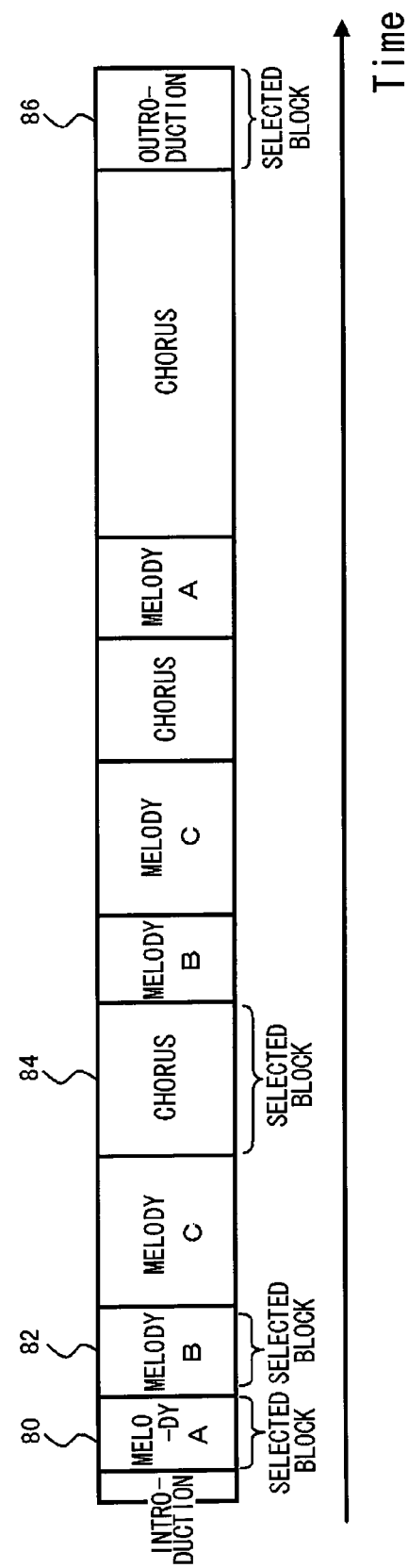
FIG. 6 shows the structure of a music piece used in the second embodiment.

Generally, a music piece is formed as a combination of blocks that come in a plurality of basic types of melody, i.e., melody blocks. Melody blocks of a given type generally contain the same melody. FIG. 6 shows an example of the time sequence of melody blocks contained in a piece of music. The graph shows time on the horizontal axis. Each rectangle represents a melody block. In the illustrated example, the melody blocks include "introduction" (prelude), "melody A", "melody B", "melody C" (intermediate parts), and "chorus" (climax), and "outroduction" (ending). "Melody A", "melody B", and "melody C" occur twice each. "Chorus" occurs three times.

Types of melody blocks other than those shown in FIG. 6 include "bridges" (interlude), solo parts, acoustical effect parts, etc. These categories are mainly used in popular music. Melody blocks are found in many music pieces including songs, instrumental pieces, etc. of various genres, though. Often, melody blocks of the same type occur multiple times.

In this embodiment, the aforementioned characteristic of a music piece is taken advantage of. The process described in the first embodiment of determining playback portions with reference to beats is only carried out in selected melody blocks. The other melody blocks are not subject to the process for playback so that the speed of fast-forward playback is further increased. In the example shown in FIG. 6, only "melody A" 80, "melody B" 82, "chorus" 84, and "outroduction" 86, which occur for the first time, are selected and subjected to the process. Playback portions in the selected melody blocks are determined as described in the first embodiment with reference to the beats included in the blocks, and are played back.

The policy for selecting melody blocks may vary depending on whether the policy is made by a music producer, a distributer, or a user. Basically, only one of melody blocks occurring multiple times may be selected. Melody blocks such as interludes that are deemed to be relatively less important in respect of musical expression may not be selected. In this way, the advantage of being able to let the user recognize a music piece while fast-forwarding is enhanced.

In addition to determining playback portions and non-playback portions with reference to beats as in the first embodiment, some melody blocks are entirely prevented from being played back. In this way, the overall playback speed is remarkably increased while allowing recognition of a music piece. If a large number of music pieces are recorded at a time without attaching an index at the start of the data for the pieces, or in the case of a movement in classical music lasting for a long period of time, the related-art, index-based playback skipping cannot be used and the user cannot get to a desired location without fast-forwarding for a long period of time.

Meanwhile, according to the embodiment, fast playback is possible in such a manner that the user is allowed to recognize a music piece. It is therefore possible to arrive at a desired music piece or a location in a short period of time. Even in a case where indexes are recorded at short intervals, the embodiment may be used for fast-forwarding so that the user can listen to the sound actually, instead of skipping from one index to another in playback. Accordingly, the user can identify a music piece in a short period of time. For example, the user can listen to digests of music pieces included in an album, an advantage useful in sales promotion and zapping.

Melody block data indicating the structure of a music piece as shown in FIG. 6 and selected melody blocks is prepared as meta data for respective audio data items and stored in the storage 12. Like beat data, the melody block data may contain the record of the timing of change between melody blocks as defined by elapsed time since the start of a music piece. Alternatively, the melody block data may be data in which the number of samples occurring since the start of the music piece is recorded. Yet alternatively, the meldy block data may be associated with the beat data such that the number of beats occurring since the start of a music piece is recorded. Still alternatively, the beat data may be marked. The data as described above may be produced and appended to the audio data by a music software production company or a distribution company that supplies the audio data. Alternatively, the data may be created by the user that acquired the audio data. The data may be included in the header of audio data or provided as a file separate from the audio data.

The data indicating the structure of a music piece may be obtained by automatically acquiring a repeated pattern of chords or the timing of chord changes in the chord progression, using a related-art acoustic analysis technology. Alternatively, the data may be recorded by providing manual inputs when one melody block is switched to another while the user is listening to music. The technology can be implemented by using, for example, related-art music production software. Melody blocks may be selected according to alternative policies. For example, melody blocks that a music producer would like the user to listen to in particular or melody blocks that the user would like to listen to when fast-forwarding may be marked in the data indicating the structure of music so as to distinguish them from other melody blocks.

The operation of the audio player 10 according to this embodiment is substantially the same as the operation described in the first embodiment with reference to FIG. 4. In the second embodiment, however, melody block data stored as meta data in the storage 12 is acquired concurrently with the acquisition of beat data in S18. The playback controller 18 determines playback portions and non-playback portions by referring to the melody block data and extracting only the timing of beats included in the selected melody blocks. The other melody blocks are determined to be non-playback portions. As described in relation to S20 of FIG. 4, only the playback portions thus determined are turned into acoustic output.

Given above is a description based on embodiments. The embodiments are intended to be illustrative only and it will be obvious to those skilled in the art that various modifications to constituting elements and processes could be developed and that such modifications are also within the scope of the present invention.

In order to achieve the mode of the first embodiment even in an environment where beat data is not prepared as meta data, the meta data acquisition unit 14 may include the function of extracting beats from audio data on a real time basis. In this case, when the beat data associated with the audio data being played back is not stored in the storage 12, the meta data acquisition unit 14 provided with the above function reads the audio data from the storage 12 and acquires the timing of beat by calculating a spectrum and a time derivative thereof.

The playback controller 18 determines playback portions as in the first embodiment with reference to the timing of beat thus acquired and causes the playback unit 20 to play back and output only the playback portions. Alternatively, the data reproduced as the metal data acquisition unit 14 acquires the timing of beat may be temporarily stored in a memory (not shown) so that only the playback portions thereof are extracted and output. In this way, the advantage of the embodiment will be equally appreciated in an environment where beat data cannot be obtained.

In the first and second embodiments, only the playback portions determined by the playback controller 18 are retrieved by the playback unit 20 for playback and output. Alternatively, the playback unit 20 may play back the entirety without making a distinction between playback portions and non-playback portions and the output unit 20 only outputs the playback portions. In this case, whether an output should be provided or not may be determined based on time, by recording the switching between playback portions and non-playback portions in the form of elapsed time since the start of a music piece. In this way, the advantage of the embodiment will be equally appreciated.

The second embodiment is designed to achieve a higher playback speed by determining selection and non-selection in units of melody blocks having the same melody, and determining the entirety of non-selected melody blocks as non-playback portions. In a broader sense, a melody block may be any unit representing a block in a music piece and partitioned from each other according to some rule. For example, the advantage of the embodiments will be equally appreciated by defining bars or verses of a song as melody blocks and preparing meta data such as that described in the second embodiment accordingly.

In some embodiments, one or more of the embodiments, methods and/or techniques described above may be implemented in a computer program executable by a processor based system. By way of example, a processor based system may comprise any type of system having one or more processors, such as a computer, cell phone, smart phone, personal digital assistant (PDA), hand-held device, DVD player, Blu-ray disc player, entertainment system, game console, etc. Such computer program may be used for executing various steps and/or features of the above-described methods and/or techniques. For example, such computer program may be used for implementing embodiments of the above-described audio player in a computer or other processor based system.

Figure 7:
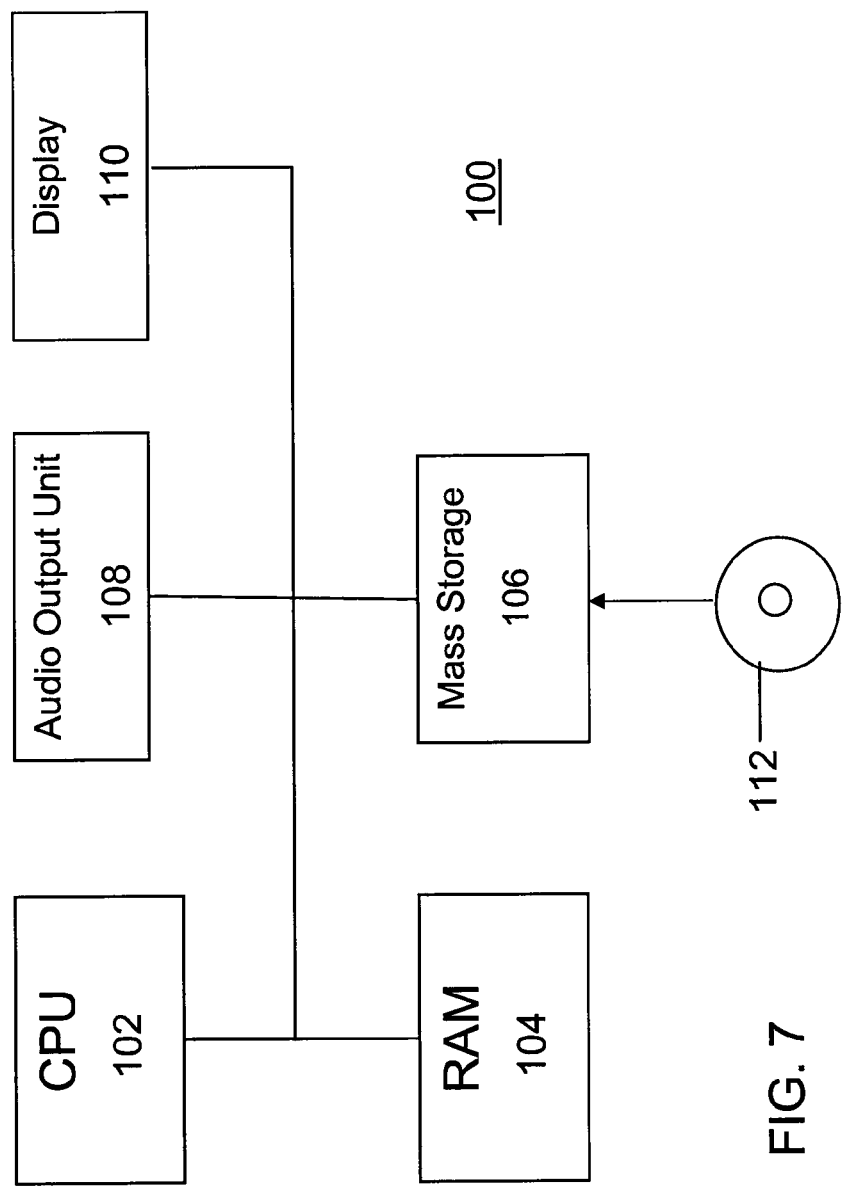
FIG. 7 is a block diagram illustrating a processor based system that may be used to run, implement and/or execute the methods and/or techniques shown and described herein in accordance with embodiments of the present invention.

FIG. 7 illustrates an example of a processor based system 100. The processor based system 100 may include a central processing unit (CPU) 102, a random access memory (RAM) 104, a mass storage unit 106, an audio output unit 108, and a display 110. The audio output unit 108 may comprise a speaker and associated sound card. The mass storage unit 106 may comprise any type of computer readable storage or recording medium and may include optional removable storage media 112 (such as a DVD, CD, or other media). By way of example, the mass storage unit 106 may comprise a hard disk drive, flash memory, USB storage, Blu-ray disc, digital video disk (DVD), compact disk (CD), floppy disk, etc. In some embodiments, the above-described computer program may be stored or embodied in the mass storage unit 106. The computer program may then be used for causing the processor based system 100 to achieve the functions of the above-described audio player.

In some embodiments, program code modules within the above-described computer program may be used for executing various steps and/or features of the above-described methods and/or techniques. For example, in some embodiments a computer readable storage medium stores a computer program adapted to allow a processor based system to achieve the function of playing back a music piece selected by a user and providing an acoustic output accordingly. The computer program may comprise: a program code module for reading from a memory beat data indicating the timing of beat that serves as a basis for a rhythm of a music piece, when a user provides an input requesting fast-forward playback; a program code module for determining a playback portion and a non-playback portion of audio data associated with the music piece in association with at least one of beats recorded in the beat data; and a program code module for reading from a memory only those portions of the audio data determined as playback portions and playing back the portions thus read.

The above description is not to be taken in a limiting sense, but is made merely for the purpose of describing the general principles of exemplary embodiments. The scope of the invention should be determined with reference to the claims.

What is claimed is:

1. An audio player for playing back a music piece selected by a user and providing an acoustic output accordingly, comprising:
    a meta data acquisition unit operative, when the user provides input requesting to fast-forward the playback of the music piece, to acquire beat data indicating a timing of beats that serves as a basis for a rhythm of the music piece being played back;
    a playback controller operative to simultaneously extract a plurality of playback portions and non-playback portions of audio data from the music piece,
    wherein the music piece is defined by a plurality of intervals, each interval defined as a unit of time from each beat of the music piece, respectively, in a discrete point in time, and
    wherein each interval is made up of a playback portion, which contains the respective beat, and a non-playback portion,
    where the playback portion is less than the interval; and
    a playback unit operative to play back only the playback portions of each interval determined by the playback controller and to prevent the non-playback portions from being played back.

2. The audio player according to claim 1, wherein each playback portion extracted by the playback controller starts at the contained respective beat at the discrete point in time.

3. The audio player according to claim 1, wherein each playback portion extracted by the playback controller starts at a predetermined period of time before the contained respective beat.

4. The audio player according to claim 1, wherein the playback controller extracts the playback portion and the non-playback portion such that between two successive beats of two successive intervals, respectively, there is contained a playback portion and a non-playback portion, and
    wherein, given that a required fast-forward playback speed is N times a normal speed, the playback controller determines that the respective playback portion of an interval should be of a duration as 1/N the interval.

5. The audio player according to claim 1, wherein the playback controller extracts a playback portion and a non-playback portion such that between every nth beat extracted from the beats recorded in the beat data there exists both a playback portion and a non-playback portion, where n is a predetermined number, and, given that a required fast-forward playback speed is N times a normal speed, the playback controller determines a duration of the playback portion as 1/N that between every nth beat.

6. The audio player according to claim 1,
    wherein, given that a required fast-forward playback speed N times a normal speed is equal to or less than a predetermined threshold value, the playback controller extracts all of the beats recorded in the beat data, and
    wherein, given that the required speed exceeds the threshold value, the playback controller extracts every nth beat from the beats recorded in the beat data and extracts a playback portion and a non-playback portion such that, between the beats thus extracted, there exists both a playback portion and a non-playback portion, and a duration of the playback portion is defined as 1/N that between every nth beat.

7. The audio player according to claim 1, wherein
    the meta data acquisition unit acquires melody block data that defines selection and non-selection of melody blocks derived from partitioning a music piece to be played back according to a predetermined rule and arranged in a series, and
    the playback controller determines a portion associated with a non-selected melody block recorded in the melody block data as a non-playback portion.

8. The audio player according to claim 7, wherein
    a plurality of melody blocks, each of which contains a melody different from the other melody blocks, is selected in the melody block data acquired by the meta data acquisition unit.

9. The audio player according to claim 1, wherein
    the meta data acquisition unit is provided with a beat extractor operative to extract the timing of beats that serves as a basis for a rhythm, based upon a time derivative of a spectrum of a signal representing a music piece being played, so as to generate the beat data.

10. The audio player according to claim 1, wherein
    the meta data acquisition unit acquires the beat data from a header of the audio data.

11. The audio player according to claim 1, wherein
    the meta data acquisition unit acquires the beat data from a storage device separated from a storage device storing the audio data and provided in a server connected via a network.

12. An audio fast-forward method comprising:
    acquiring information indicating a timing of beats that serves as a basis for a rhythm of a music piece being or to be played back;
    simultaneously extracting a plurality of playback portions and non-playback portions from the music piece, wherein the music piece is defined by a plurality of intervals, each interval defined as a unit of time from each beat of the music piece, respectively, in a discrete point in time, and wherein each interval is made up of a playback portion, which contains the respective beat, and a non-playback portion, with the playback portion being less than the interval; and
    providing an acoustic output of only portions of each interval determined as playback portions.

13. A non-transitory computer readable storage medium storing a computer program adapted to allow a processor based system to achieve the function of playing back a music piece selected by a user and providing an acoustic output accordingly, comprising:
    a program code module for reading from a memory beat data indicating a timing of beats that serves as a basis for a rhythm of a music piece being played back, when a user provides input requesting to fast-forward the playback of the music piece;

a program code module for simultaneously extracting a plurality of playback portions and non-playback portions from audio data associated with the music piece wherein the music piece is defined by a plurality of intervals, each interval defined as a unit of time from each beat of the music piece, respectively, in a discrete point in time, and wherein each interval is made up of a playback portion, which contains the respective beat, and a non-playback portion, with the playback portion having a duration that is less than the interval; and a program code module for reading from a memory only those portions of each interval of the audio data determined as playback portions and playing back the portions thus read.

* * * * *

UNITED STATES PATENT AND TRADEMARK OFFICE
CERTIFICATE OF CORRECTION

| | | |
|---|---|---|
| PATENT NO. | : 8,612,031 B2 | Page 1 of 1 |
| APPLICATION NO. | : 12/200742 | |
| DATED | : December 17, 2013 | |
| INVENTOR(S) | : Kosei Yamashita | |

It is certified that error appears in the above-identified patent and that said Letters Patent is hereby corrected as shown below:

In the Claims, Column 13, Line 60, Claim 4, delete "duration as" and insert --duration of as--, therefor.

Signed and Sealed this
Twenty-seventh Day of May, 2014

Michelle K. Lee
*Deputy Director of the United States Patent and Trademark Office*